United States Patent [19]

Wallick

[11] Patent Number: 5,292,391
[45] Date of Patent: Mar. 8, 1994

[54] CORRUGATED PAPERBOARD STRENGTH ENHANCING PROCESS

[75] Inventor: Scott A. Wallick, Seattle, Wash.

[73] Assignee: Wyerhaeuser Company, Tacoma, Wash.

[21] Appl. No.: 874,492

[22] Filed: Apr. 27, 1992

Related U.S. Application Data

[63] Continuation-in-part of Ser. No. 692,861, Apr. 29, 1991.

[51] Int. Cl.⁵ .......................... B32B 31/08; B31F 1/20
[52] U.S. Cl. ................................. 156/205; 156/210; 156/307.5; 118/324; 427/264
[58] Field of Search ................ 156/205, 210, 307.5; 427/204; 118/324

[56] References Cited

U.S. PATENT DOCUMENTS

| | | | |
|---|---|---|---|
| 1,199,508 | 9/1916 | Swift, Jr. ........................ | 156/210 |
| 3,189,502 | 6/1965 | Little ............................. | 156/210 |
| 3,341,354 | 9/1967 | Woods et al. ................... | 118/324 X |
| 3,485,575 | 12/1969 | Christian et al. .............. | 8/192 |
| 3,586,564 | 6/1971 | Brackett . | |
| 3,616,163 | 10/1971 | Reisman . | |
| 3,953,169 | 4/1976 | Igarashi et al. ................ | 8/192 |

FOREIGN PATENT DOCUMENTS

| | | |
|---|---|---|
| 0077131A3 | 9/1482 | European Pat. Off. . |
| 57-182436 | 10/1982 | Japan . |
| 59-47497 | 3/1984 | Japan . |
| 59-112096 | 6/1984 | Japan . |
| 59-179896 | 10/1984 | Japan . |
| 62-152735 | 7/1987 | Japan ........................ 156/210 |
| 1236728 | 3/1970 | United Kingdom . |

OTHER PUBLICATIONS

PCT/US92/03641: PCT International Search Report mailed Oct. 21, 1992.
K. Asei et al., "The Use of Modified Polymeric MDI in Reinforced Corrugated Fibreboard Container System," 30th Annual Polyurethane Technical/Marketing Conference, Oct. 15–17, 1986, pp. 176–181.

*Primary Examiner*—Michael W. Ball
*Assistant Examiner*—Michele K. Yoder
*Attorney, Agent, or Firm*—Klarquist, Sparkman, Campbell, Leigh & Whinston

[57] ABSTRACT

A corrugated paperboard strength enhancing process includes at least one resin application station located within the confines of the corrugator at a position where it is operable to apply a preselected amount of strength enhancing resin to at least one side of the medium after it has been fluted and most preferably before adhesive has been applied to the medium for securing liner paper thereto. At least one liner is adhered to the set of opposed flute tips. Thereafter the combined board with the resin compound on selected transverse portions of the fluted medium is allowed to cure, under selected temperature and moisture conditions and without the application of pressure that would crush the fluted medium. A suitable resin for the intended purpose is an isocyanate compound. The strength-enhanced corrugated paperboard can be efficiently repulped.

15 Claims, 8 Drawing Sheets

CORRUGATED PAPERBOARD STRENGTH ENHANCING PROCESS

CROSS-REFERENCE TO RELATED APPLICATIONS

This application is a continuation-in-part of U.S. patent application Ser. No. 07/692,861, filed Apr. 29, 1991, now allowed, entitled "CORRUGATED PAPERBOARD STRENGTH ENHANCING PROCESS."

FIELD OF THE INVENTION

The present invention relates generally to corrugated packaging materials. More particularly, this invention relates to a process for enhancing the strength of corrugated packaging materials, while retaining a level of repulpability such that these containers can be repulped as required in current industrial practice.

BACKGROUND OF THE INVENTION

Corrugated board generally refers to a composite laminated structure comprising two paper linerboard sheets bonded to a paper corrugated or fluted core material. In the context of the present description a corrugated material will mean at least one liner sheet bonded to at least one fluted layer. Single faced corrugated board refers to the structure where there are single sheets of linerboard bonded to the tips of a single fluted core layer. There are various other combinations which can be fabricated to form various well known products such as double wall board, triple wall board, and the like.

The typical process for forming corrugated materials is well known. Typically the single wall corrugated board will be formed on an in-line corrugator where large rolls of linerboard paper and a large roll of the medium paper (the starting raw material for forming the corrugated core layer) will be positioned at the upstream end of the corrugator. The process normally has the medium passing through a set of corrugating rolls and thereafter being bonded to the first liner as it travels in a downstream direction. A suitable adhesive is utilized to attach the flute tips on one side to the inside surface of the first liner. Thereafter, at a downstream location, the other liner material is laminated to the other flute tips with a suitable adhesive to form the combined board. The combined board then travels into a heating and cooling section to allow the adhesive to fully cure and bond the liners to the fluted medium. Immediately thereafter, slitter-scorer and cutoff devices function to produce individual flat sheets of slit and scored blanks for converting into containers.

As is well recognized by those skilled in the art, the structural requirements for combined board are determined by the particular requirements of the end use. Standards have been developed over the years and both the liner and medium materials are manufactured to preselected basis weights with the end-use requirements in mind. In a container a particularly important property is vertical stacking strength (top to bottom) where the vertical walls in a container are expected to support in-use compression loadings. In almost all packaging end uses the cross machine direction of the fluted medium will be oriented in a vertical direction in the package side walls. In this orientation, the liners and fluted medium will provide good vertical stacking strength. Another strength property relates to the crushing resistance (flat crush) of the combined board in a plane perpendicular to the plane of the combined board. This property depends upon the strength of the corrugated medium.

The vertical stacking strength for a container depends to a large extent upon the basis weights of the component materials. With higher basis weights for the component materials the higher the vertical stacking strength and normally the greater the top-to-bottom crush resistance. When a package needs greater stacking strength, higher basis weights will be utilized. Normally it is the customer that specifies the strength requirements and the corrugated board manufacturer will produce the packaging material accordingly. A typical combined board with medium strength is one that utilizes liner sheets with a basis weight of 42 pounds per thousand square feet and with a medium material of a basis weight of 33 pounds per thousand square feet (MSF). Typically, a package comprised of this combined board will result in an edgewise compression test (ECT) or short column value of about 45 pounds per lineal inch. A higher stacking strength can be provided by using liner sheets with a basis weight of 69 pounds per MSF and a medium basis weight of 33 pounds per MSF. This gives an ECT of about weights, additional fiber must be utilized which adds to the cost of producing the combined board and the resulting container.

Ways have been sought for many years to increase the vertical stacking strength and/or flat crush resistance without the need for utilizing additional fiber. One suggested approach has been to utilize resin compounds sprayed or otherwise coated onto one or both of the liner sheets or onto the medium material before it is fluted. In the past, isocyanate compounds have been suggested as a suitable resin which, after curing, will add strength to the particular component of the combined board. Most of these chemical additives and their processing requirements have not resulted in commercially viable strength enhancing processes and products. Problems revolve around resin handling, safety issues, costs, recycling and the like.

While the addition of resin is known for increasing the strength of packaging materials, one of its inherent problems is that once the resin cures it tends to yield a paper that is brittle and relatively inflexible. After the combined board is produced and cut into flat sheets, then the package itself must be erected. This commonly requires a plurality of slitting, scoring and folding steps which presents problems for a sheet material that is relatively brittle. One of the problems with resin additions has been the difficulty in forming good containers with treated corners that do not fracture.

The inventors of the present invention has developed a process for enhancing the strength of corrugated board packaging materials that impacts the aforementioned problems. Relatively low amounts of selected isocyanate compounds have been found to provide significant strength enhancement in the combined board when applied according to the steps of the present invention. In addition, the resulting board made in accordance with the processes of the present invention has proven to be readily recyclable to facilitate reclamation of pulp fibers from used articles made from the boards.

Accordingly, from the foregoing, one object of the present invention is to enhance the strength characteristics of corrugated board packaging material.

A further object of the present invention is to utilize relatively small amounts of isocyanate resin compounds for the strength enhancing purpose.

Yet another object of the present invention is to increase both short column strength (top to bottom) and flat crush resistance in a combined board packaging material without utilizing more fiber.

An additional object of this invention is to provide a strengthened packaging material that has the same characteristics of existing packaging materials in areas such as surface friction, white top compatibility, color and repulpability for recycling purposes.

Still another object is to minimize the contamination of the corrugator equipment with the strength enhancing resin by applying the liner adhesive and liner essentially immediately after the resin is applied to the fluted medium.

Another object of the present invention is to provide a strength-enhanced corrugated paperboard that is readily repulped.

Still another object of the present invention is to use the repulped, strength-enhanced paperboard to produce recycled paper products.

These and other objects of the present invention will be better understood upon reading the specification which follows in conjunction with the attached drawings.

SUMMARY OF THE INVENTION

Briefly stated, the present invention is practiced in one form by applying a relatively small amount of a preselected strength enhancing compound to the medium material after it has been fluted, then applying at least one liner and thereafter allowing the resin to cure, thereby providing enhanced strength to the corrugated combined board. The resin is applied to the fluted medium after corrugation and most preferably prior to the application of any adhesive for adhering a liner sheet to the medium. By curing the resin under ambient conditions, as opposed to reaching full cure under heat and pressure, repulpability of product produced from the material is enhanced. Also, the resin is applied in the most preferred approach differentially to the medium. That is, higher concentrations of resin are applied to tips and troughs of flutes of the medium than to the sidewalls of the medium. Yet, the sidewalls also have resin present. As a result, vertical stacking strength is enhanced, particularly due to continuous columns of high resin concentrations along the length of the tips and troughs of the flutes and due to the repair of fracture damage in the board caused by the fluting process. In addition, flat crush resistance is enhanced because of resin between the flute tips and troughs (as well as at the tips and troughs). However, because resin concentrations are lower at the sidewalls of the flutes, less resin is required and repulpability is enhanced. The resulting pulp is suitable for producing recycled paper products.

DETAILED DESCRIPTION OF THE PREFERRED EMBODIMENT

Figure 1A:
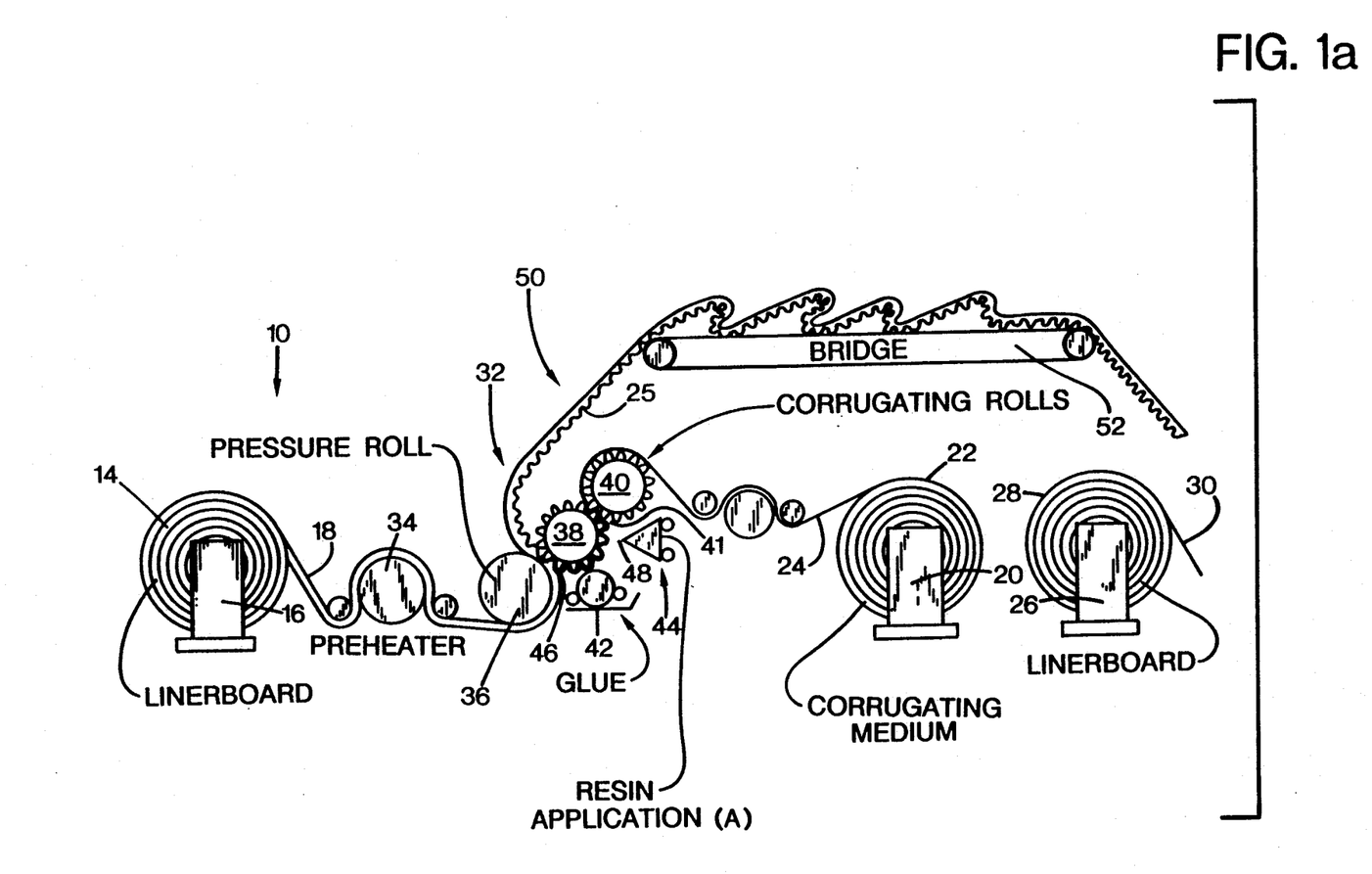
FIG. 1a and FIG. 1b, taken together, are a schematic representation of an in-line corrugated board manufacturing process including a depiction of where A or B resin application stations can be located.

Referring first to FIG. 1, a corrugating system showing alternative locations for resin application stations will be described. Briefly an upstream end is indicated at 10 and a downstream end at 12. At the extreme upstream end of the corrugator is a source of linerboard 14. Typically linerboard comes in roll stock form having been manufactured at a linerboard mill. It is mounted on stand 16 which allows it to be unrolled continuously in flat sheet form. The traveling flat sheet form is indicated throughout the process flow at 18. Shown positioned on stand 20 is a roll of medium 22. Throughout the process flow the flat medium in traveling sheet form is indicated at 24. A second liner stand 26 is positioned downstream from medium stand 20 and has a second roll of linerboard 28 mounted thereon. Extending outwardly from second liner roll 28 is the flat sheet of traveling liner 30 which begins its downstream travel from stand 26 and passes through a preheater 31 which serves the same function as preheater 34, explained below. Indicated generally at 32 is a single facer station where the first linerboard traveling flat sheet is bonded to one set of fluted tips on the corrugated or fluted medium 25. Just upstream from single facer station 32 is preheater 34 and pressure roll 36. Preheater 34 serves to heat the traveling first liner 18 in order to aid in curing of adhesive utilized to adhere liner 18 to the fluted medium. Pressure roll 36 serves to keep the sheet flat and under proper tension as it travels into the single facer station 32. Adjacent to single facer station 32 is a pair of corrugating rolls 38, 40 which are standard and well known to those skilled in the art and they serve to form flutes in the incoming traveling medium 24. Where the corrugating rolls 38, 40 mesh at nip 41, medium 24 will be fluted to become corrugated medium 25. Thereafter, the fluted medium is carried around roll 40 and at glue station 42 receives a coating of glue on the flute tips. Thereafter fluted medium 25 and first liner 18 are combined at nip 46.

In one embodiment, at a resin application station generally indicated at 44, a solution of suitable strength enhancing resin, such as suitable isocyanate compound is sprayed or otherwise applied to all or a portion of the exposed surface of the already fluted traveling medium 25. As depicted in FIG. 1, immediately after the resin is applied, the typical bonding adhesive (commonly a starch solution) is applied at nip 46. By applying the glue after the application of the resin, the glue doesn't interfere with the penetration of the resin into the medium and the application of the resin to the medium. Also, by applying the resin to the fluted medium downstream from the corrugator, buildup and curing of resin on the corrugator (which could interfere with the operation of the corrugator, is minimized. At resin application station 44, suitable means are provided, such as spray means 48, to apply a predetermined amount of resin solution to the traveling fluted medium. As explained below, most preferably a differential resin coating is applied, with higher concentrations of resin in columns along the full transverse dimension or width of the medium being present at certain locations (e.g. along the full length of the troughs and flutes or at other locations) and lower concentrations along the full width of the medium at other locations (e.g. along the length of the sidewalls of the flutes). In another embodiment, just the tips of the flutes are coated with the suitable isocyanate resin.

Figure 1B:
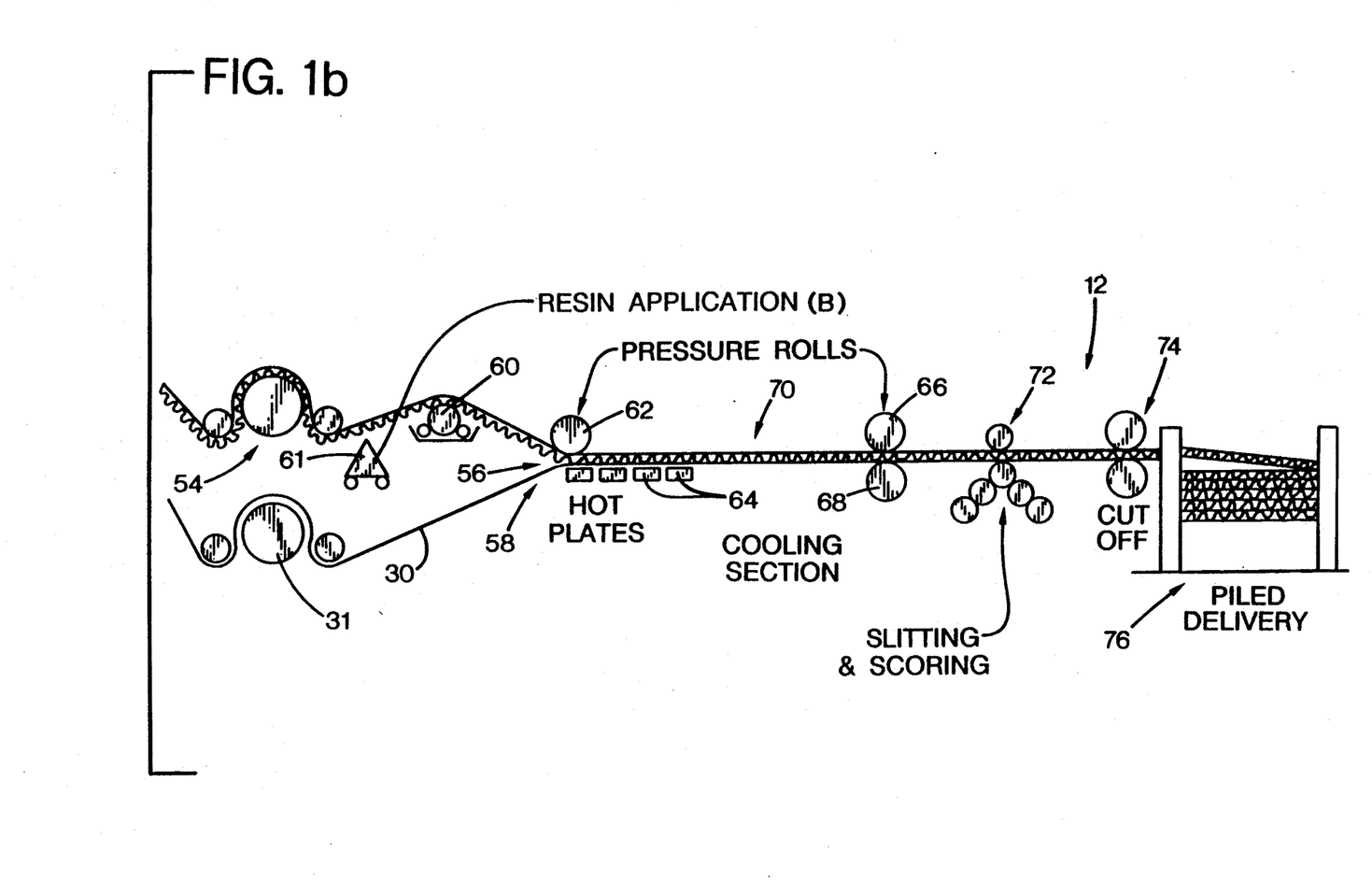

After the strength enhancing resin solution is applied to the fluted medium and the medium combined with the first liner 18 and joined thereto, the traveling single faced material indicated at 50 is caused to travel upwardly and across a bridge station indicated at 52 and then further in a downstream direction around a fluted tension and drive station 54 (FIG. 1b). Thereafter, the second liner 30 is caused to travel towards a nip 56 at the double facer station generally indicated at 58. Simultaneously, the single faced material 50 travels towards nip 56 and in the process passes adhesive application station 60 where the typical starch based adhesive is applied to the flute tips. Optionally, resin is applied upstream from adhesive station 60 at resin application location B. At this location, suitable means, such as a sprayer 61, applies a predetermined amount of resin to the exposed flutes of the already fluted medium. Thereafter, the components are combined at double facer station 58 to form double backed combined board having the two liner sheets and the resin treated corrugated or fluted medium therebetween.

Just downstream from nip 56 is top pressure roll 62 and therebeneath are a series of hot plates 64 to apply light pressure and heat to cure the standard adhesive and to initiate curing of the strength enhancing resin. Downstream pressure rolls 66, 68 also apply pressure. Extending between the last hot plate 64 and pressure rolls 66, 68 is cooling section 70. The hot plate 64 and cooling section 70 typically maintain the temperature of the fluted medium between from about 200° F. to about 250° F. Most preferably, the temperature is maintained at a level that causes rapid evaporation of water to minimize the pressure of water which would contribute to curing of the resin while still setting the adhesive. Preferably, the process is operated to prevent significant curing of the resin on the medium as a result of this heat. Consequently, the resulting material is allowed to cure under ambient temperature and pressure (e.g., the temperature of the storage area which might be about 70° F.), which enhances the repulpability of the material. Equilibrium moisture content of the board provides enough water to drive the curing reaction. Yet, the slower cure rate provides lower cross-linking and lower resin advancement, both of which contribute to increased repulpability, while still providing a strength-enhanced product.

The standard combining adhesive generally cures very rapidly and immediately downstream from pressure rolls 66, 68 is a slitting and scoring station indicated at 72 and thereafter a cutoff station 74. Immediately after cutoff station 74 is well known means indicated at 76 for neatly piling the individual flat sheets of cut and scored combined board. After stacking, the strength enhancing resin is allowed to continue its curing under ambient humidity, temperature and pressure.

In one alternative embodiment for applying the strength enhancing resin to the already fluted medium, the application station 61 is located adjacent the double facer station 58, and will be functional to apply the suitable strength enhancing resin to the fluted medium. Again a suitable means for applying a preselected amount of resinous solution such as airless spray, air assist, electrostatic or the like may be used. The strength enhancing solution could be applied at almost any point after the medium is fluted, but before the covering liner is joined to the fluted medium. However, again, application of the resin ahead of the adhesive is most preferred. If aqueous starch is used as an adhesive, as is common, the application of this adhesive prior to the resin would result in the adhesive tending to float the resin and keep it away from penetrating the flute tips. Consequently, strength of the resulting paperboard would be compromised. Other adhesives may not suffer from this problem.

Figure 2A:
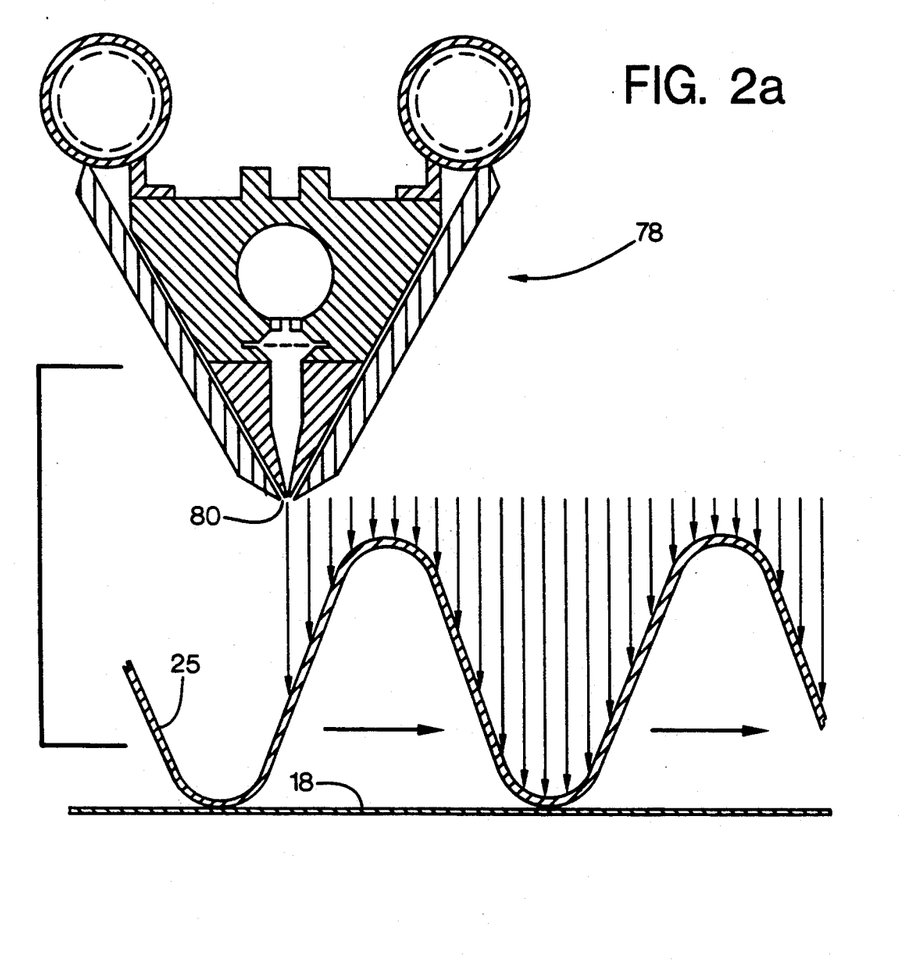
FIG. 2a is a representation of a liner sheet and a fluted layer of medium showing the resin being sprayed on the entire surface of the fluted medium
Figure 2B:
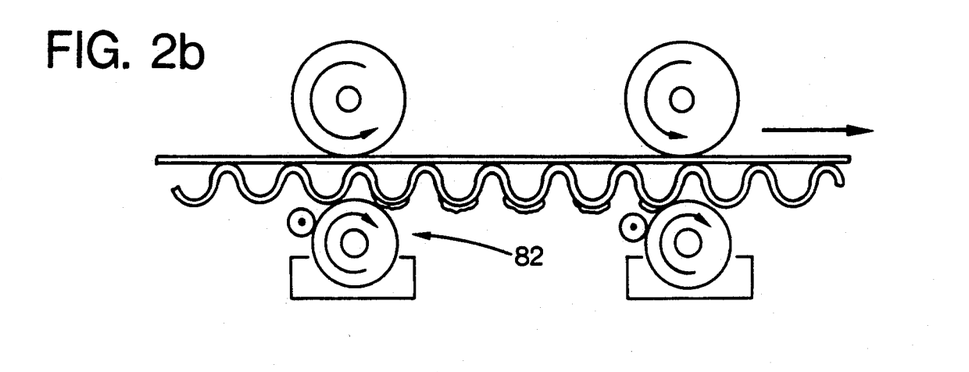
FIG. 2b is a similar representation showing the resin being applied onto the flute tips only with a flute tip roll coater.
Figure 2C:
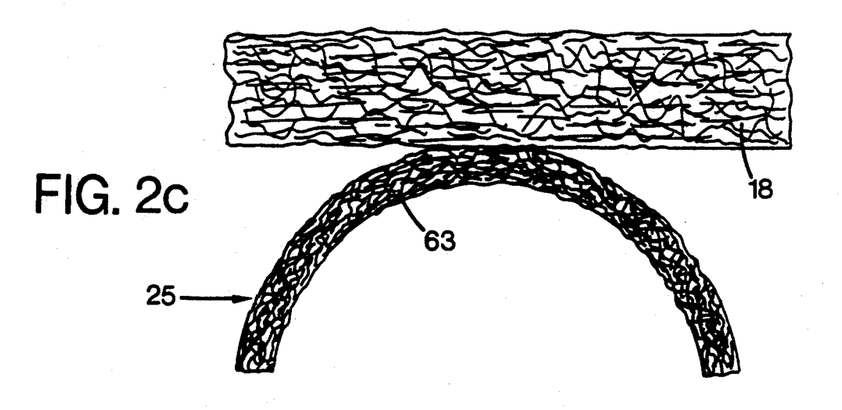
FIG. 2c illustrates a flute tip with applied resin, applied in the manner of FIG. 2a, the resin penetrating the entire flute tip as represented by the dark fibers in this figure.
Figure 2D:
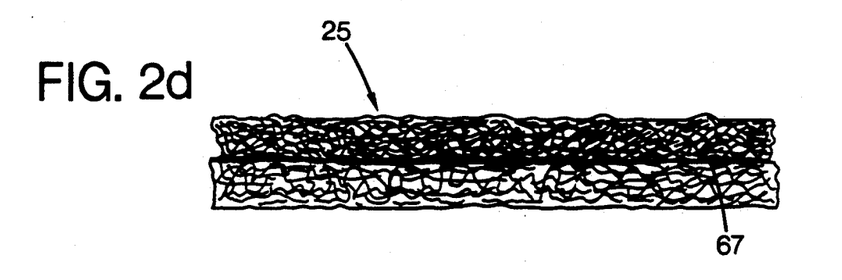
FIG. 2d illustrates a flute sidewall with applied resin applied in the manner of FIG. 2a, the resin partially penetrating the sidewall as indicated by the dark fibers in this figure.
Figure 2E:
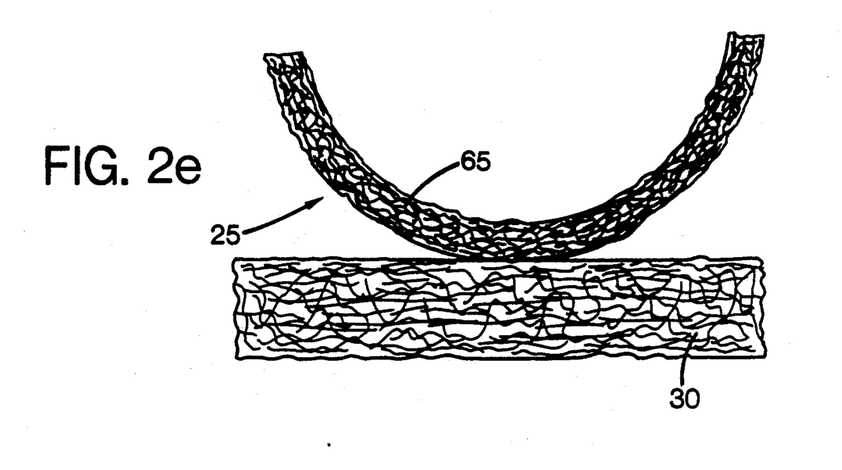
FIG. 2e illustrates a flute trough with applied resin, applied in the manner of FIG. 2a, the resin penetrating the entire flute trough as represented by the dark fibers in this figure.

In FIG. 2a a suitable spray head is indicated at 78 and is structured and functions to spray a mist solution of the suitable strength enhancing resin onto the fluted medium. Spray head 78 is of the type that has a plurality of individual nozzles, each indicated at 80, spaced across its width. Alternatively, the sprayhead may have one or more elongated slots. These nozzles apply resin uniformly across the entire exposed surface area of the fluted medium. Typically, a stream of air is used to atomize or block resin drops emerging from the nozzle orifice(s) to cause the uniform application of resin across the width of the medium. Its detailed structure may be similar to the multiple orifice heads illustrated in many issued patents such as U.S. Pat. Nos. 3,942,723 and 4,128,667. Other preferred examples are shown in the following U.S. and PCT applications, all of which are incorporated herein by reference: U.S. patent application, Ser. No. 07/801,961, filed on Dec. 2, 1991; U.S. patent application, Ser. No. 07/801,964, filed on Dec. 2, 1991; and published application PCT/US91/03830, filed on May 30, 1991. FIGS. 2a, 2c, 2d and 2e illustrate that when such an elongated uniform spray is utilized, a differential spray application results. That is, for example, there will be relatively larger amounts or higher concentrations of the resin on the flute tips and in the flute troughs than along the sidewalls of the flutes. For example, with isocyanate resin solution being sprayed onto the medium at 15% add-on at only one resin application location 44, FIGS. 2c and 2e illustrate a respective flute tip 6 and trough 65 of the medium 25 which have been entirely penetrated with resin. In addition, FIG. 2d illustrates a sidewall 67 which is only about half penetrated with resin. If two resin application locations are used, by reducing the resin content of the applied spray or increasing the traveling speed of the medium past the resin application locations, full (or partial) penetration of flute tips and troughs occur while partial penetration of the sidewalls (from both surfaces) can be accomplished with a mid-region of the sidewalls being resin free. Again, in this spray approach, along the inclined flute side walls there will be relatively less resin. This is because of the fact that, for a constant line speed of the fluted medium, the surface area passing the resin applying location per unit then increases as the sidewall or slope portions of the medium travel past the spray applicator as compared to the surface area per unit then passing the resin applying location(s) when the flute tips and troughs pass such location(s). When, indicated at 82 in FIG. 2b, a roll coater is utilized only the flute tips will receive the resin.

In general, by providing continuous columns of resin penetrated medium, particularly with uniform amounts of resin along the full width of the medium (e.g. along the total length of flute tips and/or troughs), vertical stacking strength is enhanced. By providing a resin bridge between the continuous columns (e.g. resin along the length of the sidewall portions of the flutes and between the flute tips and troughs), flat crush resistance is enhanced. Also, by applying less resin in the bridging areas, repulpability is enhanced. Of course, differential concentrations of resin can be applied in other manners. For example, flute tips may be roll coated while a separate sprayer or other applicator is used to apply a different amount of resin to the surface area of the fluted medium, the combination of the plural resin applicators producing the differential coating. Other suitable differential resin applying approaches may also be used. It should be pointed out that over the selected width of the traveling fluted medium for resin application a uniform preselected amount of resin should be applied to derive the greatest benefits.

Turning now to operating characteristics and raw material selection it will be well understood by those skilled in the corrugated packaging field that typical linerboard for utilization in the present process can be produced and supplied in basis weights generally ranging from 26 to 90 pounds per MSF while medium basis weights range from approximately 26 to 40 pounds per MSF. As noted in the background of the invention, when it is desired to produce a container with a higher top-to-bottom compression strength or stacking strength, the traditional method calls for utilizing a higher basis weight linerboard on the outside of the container. This takes more fiber with the attendant higher costs. It is known that substantially increasing the basis weights of the fluted medium does not add to higher performance. In fact, it has been found that over time with higher basis weights in the medium, their top-to-bottom and flat crush strength characteristics either remained the same or actually decreased. This has been found to result from the fluting operation where the medium experiences a great deal of stretching and compressing while passing through the nip of the corrugated rolls. With thicker medium, fracturing of the material is more significant and, therefore, results in lower strengths.

Figure 3:
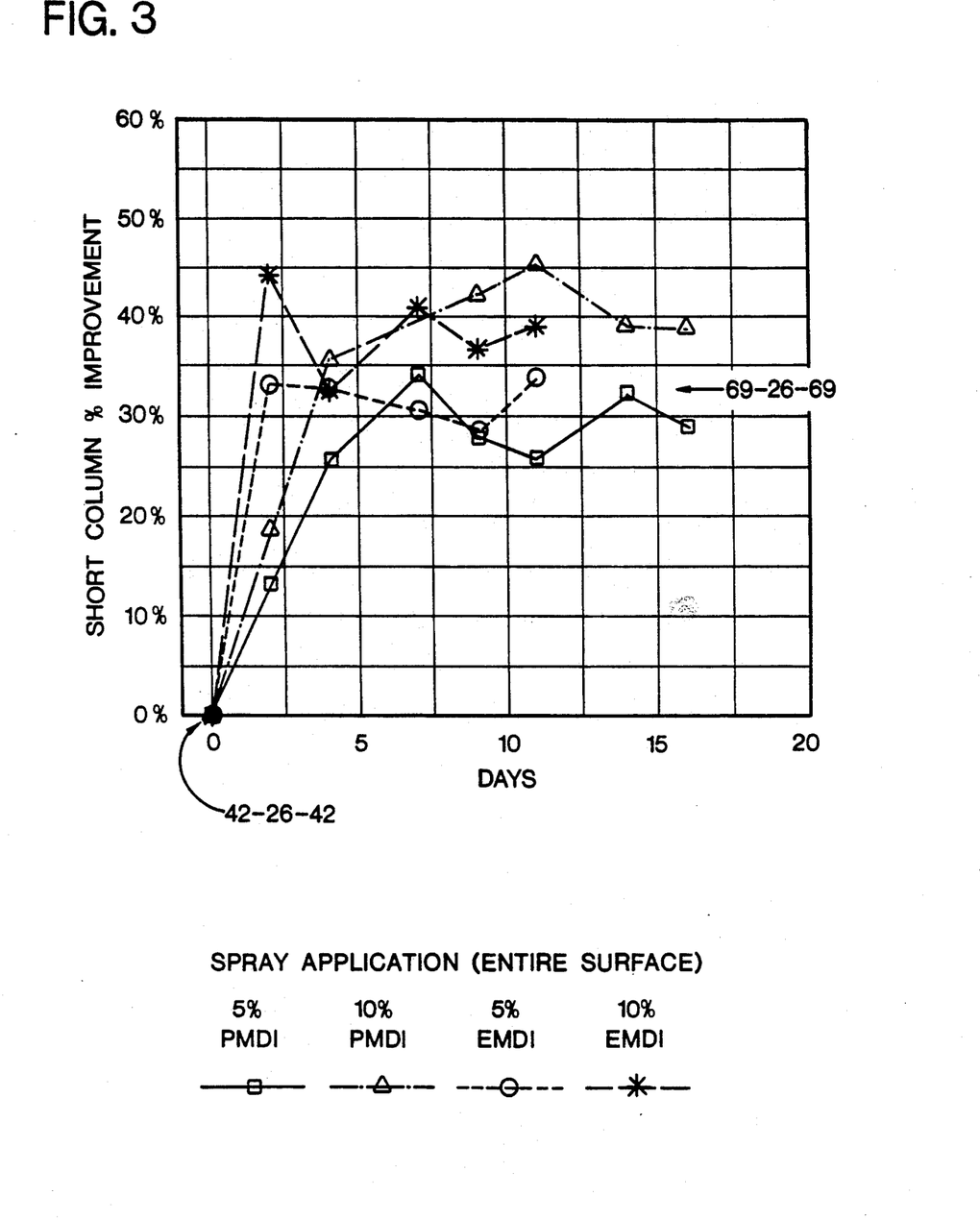
FIG. 3 is a graphic representation showing short column (ECT) improvement versus curing time for selected application mounts and two different isocyanate resins.
Figure 4:
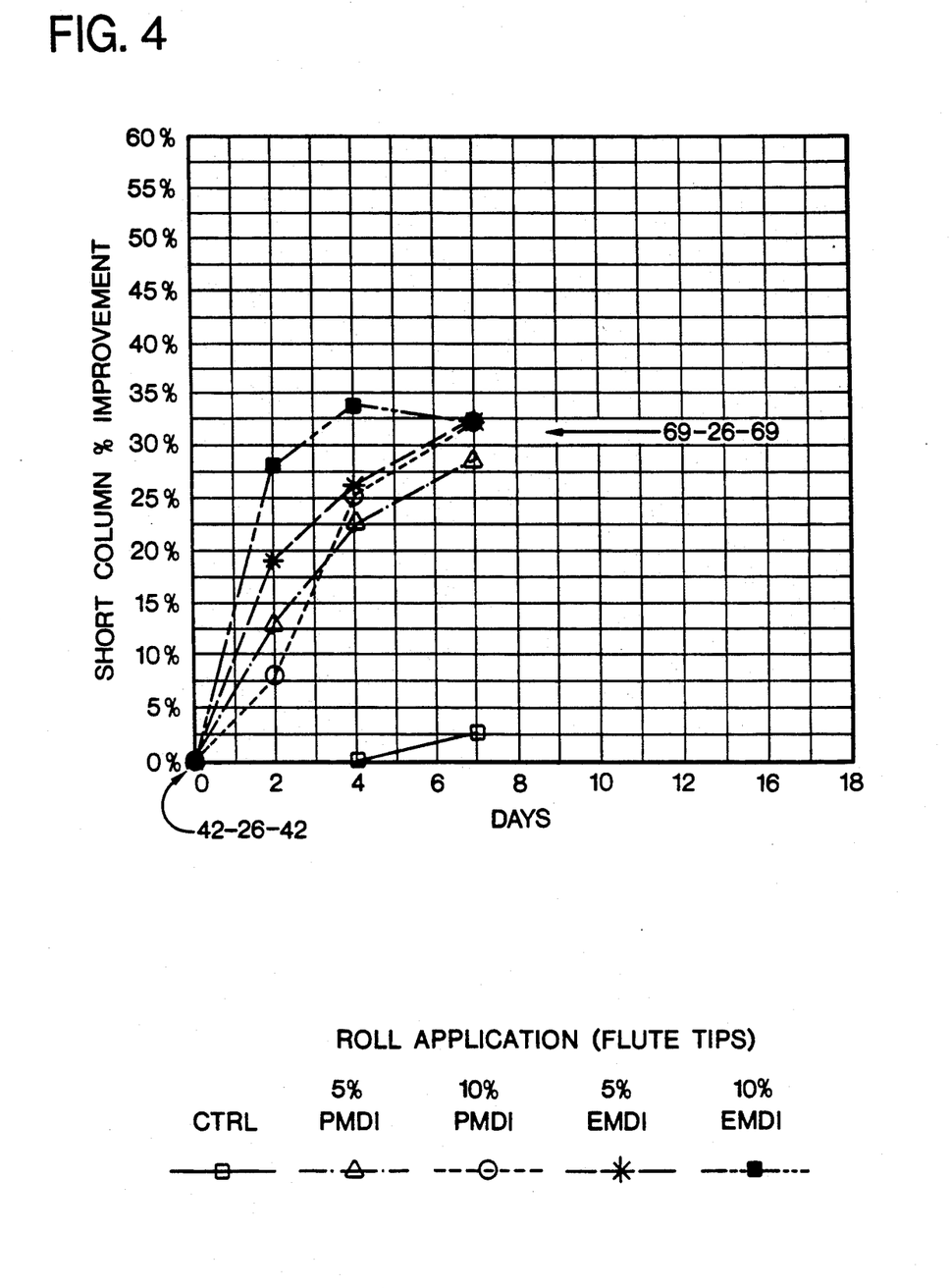
FIG. 4 is a graphic representation similar to FIG. 3 showing results when the resins are applied only to the flute tips.
Figure 5:
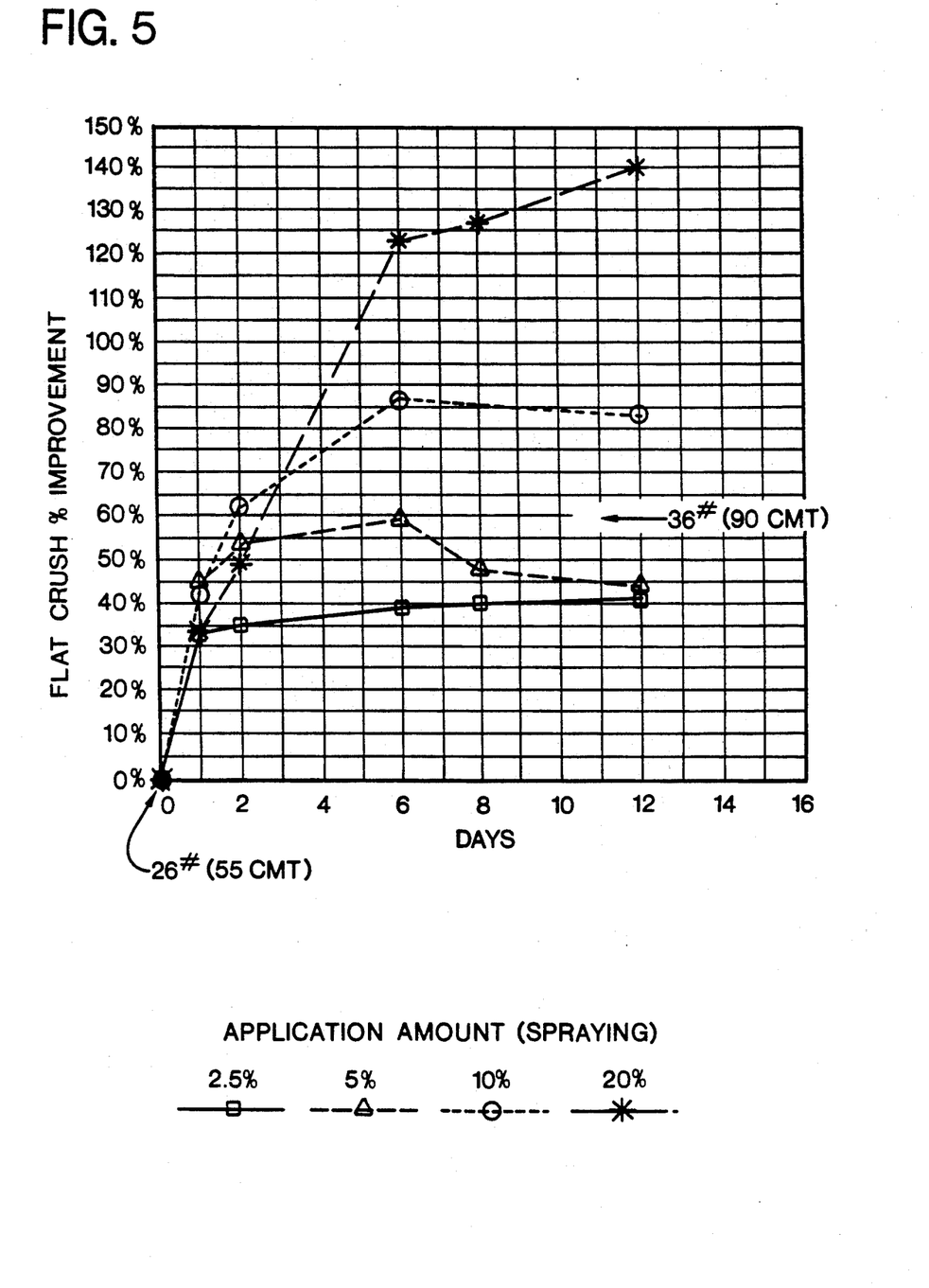
FIG. 5 is a graphic representation showing flat crush improvement versus time and selected application amounts when the resin is sprayed on the fluted medium with a differential application of resin (more resin on the tips and troughs than on the sidewalls of the flutes).

The present invention actually provides a means for stiffening the medium after it has been corrugated or fluted, thereby avoiding problems encountered with past efforts. The fundamental effort is to strengthen the combined board by the resin addition and curing so that relatively less fiber can be utilized with the resulting combined board providing enhanced strength. One suitable isocyanate resin compound is polymeric methylene diphenyl diisocyanate (PMDI). Another is an emulsifiable polymeric methylene diphenyl diisocyanate (EMDI). As previously described, these chemical compounds in liquid form, or in the form of an emulsion in the case of EMDI, may be sprayed onto the fluted medium (over a selected width) thereby coating differentially all surfaces of the fluted medium or it may be applied by a flute tip roll coater only to the flute tips. Other application approaches may also be used. These types of resins begin to cure under conditions present in the double backer section of a corrugator and ultimately cure over time under ambient temperatures and in the presence of ambient moisture conditions. Total cure times are illustrated in the graphs of FIGS. 3–5. It could be applied to both surfaces of the fluted medium if desired. As will be apparent, varying amounts of the resin will enhance the strength to different degrees.

As mentioned earlier, the stretching and compressing experienced during the fluting operation weakens the medium significantly. The underside of the flute tip, the trough or valley, is compressed greatly while the surface of the medium on the outside of the flute tip experiences a great deal of stretching. As a consequence of this stretching, the outer surface of the flute tip develops localized weak areas or delamination "fissures."

The advantage of applying the strength resin after the medium has already been fluted is that it can coat the exposed "insides" of these delamination fissures after they develop. If the flat medium is coated with the chemical resin before fluting, these fissures open up only after the chemical is applied and thus the surface of the fissures that open up after fluting remain untreated. In this case the strength enhancing resin is not concentrated in the localized areas that need the enhancement. This mechanism also accounts for the fact that significant strength enhancement is obtained even when only the flute tip areas are treated.

FIGS. 3, 4 and 5 show resulting enhanced strength properties from practice of this process. What has been found is that when comparing a traditional combined board which is manufactured using 42 pounds per MSF liner and 26 pounds per MSF medium by using the present invention, this combination may actually be enhanced to an equivalent short column (top-to-bottom) strength characteristic of combined board having 69 pound liners and a 26 pound medium. Thus, the strength gain is approximately 33% by utilization of the present process.

The curves in the graphic figures illustrate very clearly the enhanced vertical stacking or column strength properties obtainable from using the isocyanate compounds for stiffening the medium, therefore, the resulting paperboard structure. For example, in FIG. 3 at the (0,0) point it is represented that this combined board is a typical 42-26-42 pound composite. Through a spraying application of 5% on a weight basis (weight resin solids to the weight of the medium) of the medium of either PMDI or EMDI and allowing a cure time of about 5 days under ambient conditions for PMDI, the short column or top-to-bottom stacking strength improvement will approximate 33%. The EMDI cures somewhat quicker needing only two days under ambient conditions to cure and provides relatively easier cleanup. With this improvement, we have the 42-26-42 combination with respect to the fiber components resulting in an equivalent strength of a 69-26-69 combination of materials. It becomes quite apparent that through the use of a relatively small amount of resin and with no increase in fiber, top-to-bottom column strength properties, vertical stacking strength, may be significantly enhanced. With the application of 10% by weight it may be seen that an approximate 40% strength improvement is obtained. It is believed that strength enhancement will occur as the isocyanate resin compound is added in an amount within a range of from 0.5-50% by weight of the medium. However, a most preferred resin add-on is from about 5% to about 20% resin by weight solids to the weight of the medium.

As shown by the curves on FIG. 4, similar vertical stacking strength results are obtained when only the flute tips are coated with the resin but in substantially the same amounts by weight. In the case of a 10% by weight addition (2.6 pound/MSF of combined board), whether it be PMDI or EMDI an approximate 33% improvement is obtained without any addition of fiber in either the liner or the medium.

In FIG. 5, curves are illustrated that show the typical percentage improvements in flat crush when spraying an isocyanate compound over flute tips, troughs and side walls utilizing a sprayer as shown in FIG. 2a. It can be noted, for example, that when adding 5% or 1.3 pound/MSF resin and allowing a cure time of about two days the flat crush is improved approximately 50% and results in an equivalent 36 pound basis weight medium. Flat crush improvement is a result of the strength enhancing resin being cured over substantially all portions of at least one side of the fluted medium. When the resin is applied only to the flute tips, flat crush is not improved appreciably, however, as noted in FIG. 4, short column improvement will still occur. Again, the resin bridges along the slopes of the flutes between the resin at the tips and troughs of the flutes enhances the flat crush performance when the resin application is not limited to the flute tips. To achieve the enhanced column strength, however, continuous top to bottom columns of resin in the medium is most preferred. Thus, a point sprayer would not provide a uniform top to bottom concentration of resin in the medium and therefore is not very satisfactory.

Since the isocyanate resin is applied to the fluted material within the confines of the corrugator at the locations previously described as being alternate locations, handling problems are significantly reduced. Significant strength enhancement is obtainable using a relatively small amount of the selected isocyanate resin, typically 10% or less by weight, applied evenly to the selected surface area of the medium after it has been fluted. When applying the resin to the flute tips, recycling will be easier since the resin does not cover the entire surface area of the flutes thereby making repulping easier. Larger amounts of resin may be added with enhanced strength, however, costs increase and recyclability may be compromised. However, by applying the resin in a differential manner, for example with columns of resin at high concentration in the medium bridged by areas of medium or lower resin concentration, e.g. the slopes or sidewalls, enhanced column strength and flat crush resistance results, while still providing a readily repulpable product.

Other suitable chemical compounds that may be utilized to provide a stiffer fluted medium are various acrylics, polyvinyl acetates/alcohols, various latexes, styrene-maleic anhydride, epoxy resins, and others. They are resins that cure with little or no heat or pressure; preferably under ambient conditions. The use of catalysts can speed cure time. Since it is the fluted medium that contains the cured resin, the covering liners are unaffected and thus printability and other properties of the outer liner faces are retained.

Thus, it will be appreciated that a significant advantage can be obtained when practicing the process of the present invention. By utilizing a relatively small amount of strength enhancing resin applied to the medium after it has been fluted and allowing it to cure after bonding at least one liner to the medium, resulting strength properties of the combined board will be significantly enhanced. Selected areas across the width of the medium can be treated with the strengthening compound if desired.

Figure 6:
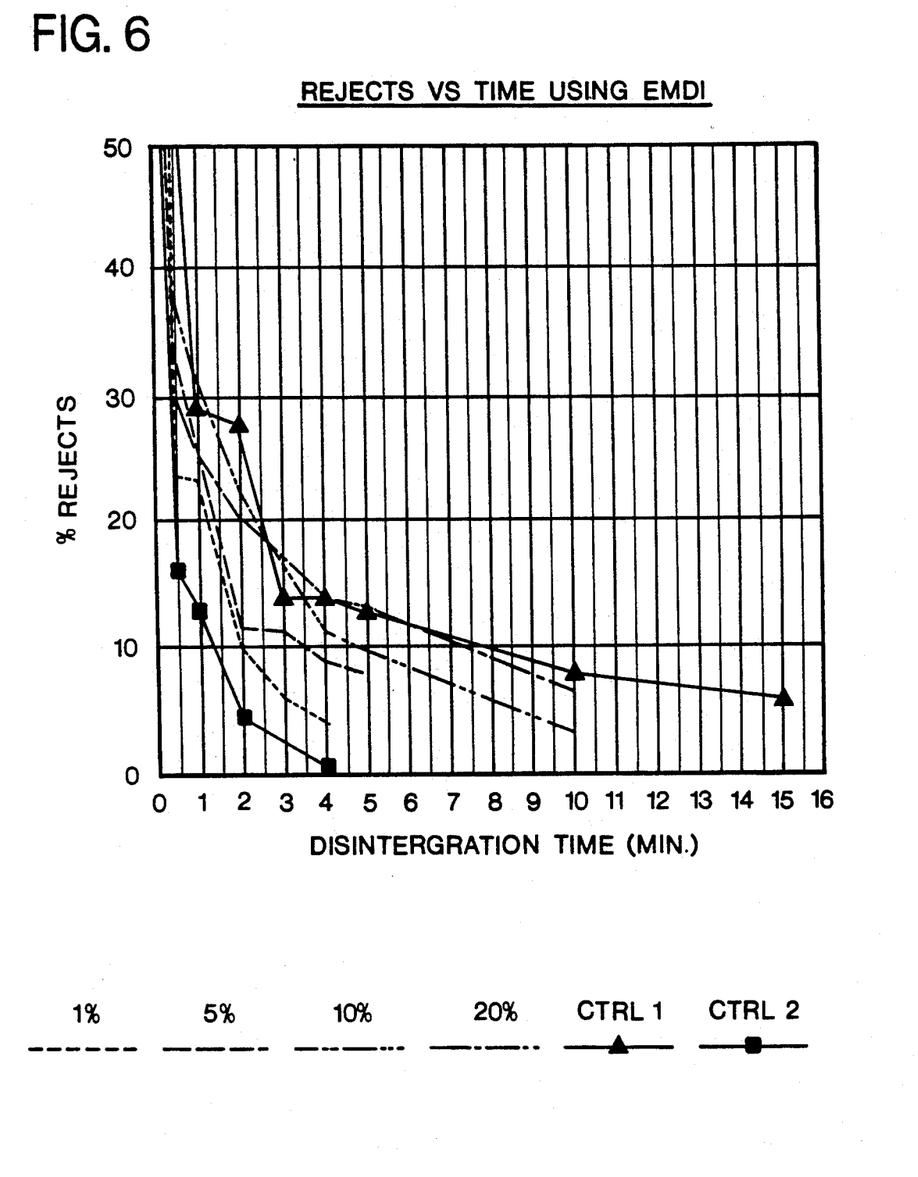
FIG. 6 is a graphic representation showing the reject percentage versus disintegration time for corrugated paper medium treated with varying amounts of EMDI resin.

It is also important to note that the strength-enhanced combined paperboard produced by the methods described above can be repulped and used to form recycle paper products. Currently, there is no standard industrial test for determining the repulpability of a paper product, especially a strength-enhanced corrugated paperboard made according to the present invention. However, Applicants have endeavored to produce a strength-enhanced corrugated paperboard that can be repulped at least as efficiently as paper products currently being produced. For this reason, Applicants arbitrarily chose as a first control, CTRL 2 in FIG. 6, Weyer-Pak ®, which is a linerboard material that is used on occasion to produce corrugated board with some resistance to moisture. Weyer-Pak ® is moderately difficult to repulp. Weyer-Pak ® was used as a standard against which the repulpability of the strength-enhanced paperboard of the present invention was compared. Weyer-Pak ® is a normal Kraft-liner product that contains a cationic wet-strength finishing agent. Weyer-Pak ® is moderately difficult to repulp because the cationic wet-strength agent holds the paper fibers together upon wetting. Weyer-Pak ® is known to be repulpable using commercial repulping processes without undue difficulty. A second control, CTRL 2 in FIG. 6, is a double-faced untreated corrugated board. As is shown in FIG. 6, Applicants' corrugated paperboard made using polymeric methylene diphenyl diisocyanate (PMDI) or an emulsifiable polymeric methylene diphenyl diisocyanate (EMDI) resin can be repulped and converted into recycled paper products at least as efficiently as Weyer-Pak ®.

For repulp testing purposes, the corrugated board samples of FIG. 6 were first cut into small pieces typically on the order of from about 25 mm to about 200 mm (from about 1 inch to about 8 inches) in length. These paperboard fragments were then soaked in water at a temperature of about 100° F. to about 212° F. A particular water temperature useful for repulping the strength-enhanced paperboard has been found to be about 140° F. A sufficient amount of water is used to at least partially cover the pieces of paperboard, it being most preferred to completely immerse the paper product in the water. To do so, a weighted screen or similar object was placed on top of the soaking paperboard pieces to ensure that the pieces remained immersed in the heated water.

The paperboard-water mixture was blended for a period of time in a Waring blender with a dull blade which puts low shear into the system. A typical consistency of this mixture (weight of paper relative to total weight of water) was from about 1% to about 3%. The paperboard was then deflaked using a conventional disintegrator, such as a British disintegrator. On a commercial scale, the corrugated paperboard would be disintegrated using a conventional hydropulper. Paperboard disintegration was typically continued for a specific number of revolutions of the disintegrator (in this case, 600 revolutions). After the paperboard was disintegrated, it was then filtered through a screen having screen orifices of about 0.006 inch to determine what percent by weight of the paperboard was not disintegrated. Paperboard which does not pass through a screen having these screen orifices are referred to as repulping rejects.

More specifically, in producing the test results of FIG. 6, fifty grams of unbleached strength enhanced paperboard product of each of the FIG. 6 types were oven dried and then cut into 25 mm-200 mm strips. These strips were of corrugated board including fluted medium. In the case of the EMDI treated board, the resin was applied in the manner of FIGS. 2a, 2c, 2d and 2e to provide a differential resin coating. The strips were then immersed in 1250 milliliters of tap water heated to 60° C. (140° F.). The water and strips of paperboard were then added to a one-gallon Waring blender and repulped at low speed for exactly three minutes. The paperboard was then soaked for thirty minutes under mild agitation by the blender at 2.5% consistency (the total volume of paper and water was 2000 cc). The paperboard was then deflaked for 600 revolutions of the British disintegrator. Once the paperboard was deflaked, it was passed through a flat screen to determine the percent of paperboard that was not repulped. The material not passing through the screen was then oven dried and reweighed to determine what weight percent of tee total paperboard weight was not repulped by the described procedure. This weight of paperboard was referred to as the repulping rejects.

FIG. 6 shows the weight percent (reject percent) of a control (paperboard not coated with a strength enhancing agent), Weyer-Pak ®, and strength-enhanced corrugated paperboard coated with 1%, 5%, 10% and 20% of EMDI resin versus time obtained using the procedure described immediately above. Although the control has a lower reject percentage than does the Weyer-Pak ® or the strength-enhanced paperboard, FIG. 6 clearly shows that strength-enhanced corrugated paperboard made according to the present invention can be repulped at least as easily as Weyer-Pak ®.

Strength-enhanced corrugated paperboard made according to the present invention can be repulped to achieve a reject percentage of from about 30% to about 5% depending the disintegration time. More specifically, strength-enhanced corrugated paperboard made using 20% EMDI resin and disintegrated for a period of time of about 10 minutes has a reject percentage of about 7%, whereas Weyer-Pak ® has a reject percentage of about 8% after a disintegration period of 10 minutes. Strength-enhanced corrugated paperboard made with lower concentrations of EMDI are more readily repulped relative to Weyer-Pak ®. For instance, strength-enhanced paperboard made with 5% EMDI has a reject percentage of about 8 percent after a disintegration time of five minutes, whereas Weyer-Pak ® has a reject percentage of about 14% after a disintegration time of 5 minutes. Applicants have determined that the strength-enhanced paperboard repulped according to the procedures described herein is suitable for making recycled paper products. The repulpability of the strength enhanced paperboard would decrease in the event the same concentration of resin was applied to all areas of fluted medium in contrast to the case where lower resin concentrations were present in selected areas of the medium (e.g. the sloped areas on sidewalls). Also, the repulpability would decrease to the extent heat and moisture are used on-line to cure the resin as opposed to utilizing ambient cure conditions. Therefore, for at least a majority of the curing of the resin, ambient cure conditions are preferred.

While a detailed description has been given of the corrugated paperboard strength enhancing process, it may occur to those skilled in the art to make modifications and additional enhancements thereto. All such modifications are intended to be included with in the scope of the appended claims.

I claim:

1. A process for increasing the strength of combined corrugated paperboard using a strength enhancing resin, comprising:
   providing a fluted medium having side edges and flutes extending transversely between the side edges, the flutes having flute tips, flute troughs and flute side walls between the flute tips and flute troughs;
   moving the fluted medium in a direction with the flutes extending transversely to the direction of travel of the medium;
   applying a preselected amount of uncured strength enhancing isocyanate resin to the moving fluted medium after it has been fluted so as to create continuous spaced apart columns of resin in the fluted medium of a first concentration extending transversely relative to the direction of travel of the fluted medium, said resin extending from one side edge to the opposite side edge of the fluted medium, said resin being applied so as to create bridging areas of resin in the fluted medium of a second concentration lower than the first concentration and extending between the continuous columns of resin;
   adhesively securing at least a first liner to the fluted medium; and
   curing the isocyanate resin to harden to the resin with columns and bridging areas in the fluted medium and so as to provide enhanced strength to the paperboard.

2. A process according to claim 1 in which the step of applying a preselected amount of uncured isocyanate resin comprises the step of partially penetrating the bridging areas of the fluted medium with the isocyanate resin while completely penetrating the columns with the isocyanate resin.

3. A process according to claim 1 in which the step of applying isocyanate resin comprises the step of applying isocyanate resin so as to create continuous spaced apart columns of resin in the fluted medium of a first concentration along at least the entire length of the flute tips of the fluted medium.

4. A process according to claim 3 in which the resin applying step comprises the step of also applying isocyanate resin so as to create continuous columns of the resin in the fluted medium along the troughs of the fluted medium and applying resin in the sidewalls between the flute tips and flute troughs of a second concentration which is less than the first concentration.

5. A process according to claim 2 in which the applying step further comprises the step of completely penetrating at least the flute tips with the isocyanate resin.

6. A process according to claim 5 in which the applying step further comprises the step of also completely penetrating the flute troughs and partially penetrating the sidewalls of the fluted medium.

7. A process according to claim 1 in which the curing step comprises the step of curing the isocyanate resin under ambient temperature and humidity conditions.

8. A process according to claim 1 in which the adhesively securing step is performed after the resin applying step.

9. A process according to claim 2 in which the curing step comprises the step of curing the isocyanate resin under ambient temperature and humidity conditions.

10. A process according to claim 2 in which the adhesively securing step is performed after the resin applying step.

11. A process according to claim 3 in which the curing step comprises the step of curing the isocyanate resin under ambient temperature and humidity conditions.

12. A process according to claim 3 in which the adhesively securing step is performed after the resin applying step.

13. A process according to claim 1 in which the step of curing the isocyanate is performed by allowing the isocyanate to cure following the adhesive securing step without a heating step.

14. A process for increasing the strength of combined corrugated paperboard using a strength enhancing resin, the paperboard including a fluted medium having flute tips, flute troughs and flute sidewalls extending between the flute tips and flute troughs, comprising:

providing a fluted medium;

applying a preselected amount of uncured strength enhancing isocyanate resin to the fluted medium after it has been fluted, the isocyanate resin being applied so as to create continuous spaced apart columns of resin extending continuously along at least the flute tips of the fluted medium and so as to create bridging areas of resin in the fluted medium of a lower concentration than the first concentration between the columns of resin of the first concentration;

adhesively securing at least a first liner to the fluted medium following the resin applying step; and curing the isocyanate resin under ambient conditions of humidity and temperature to provide enhanced strength to the paperboard having a fluted medium with cured resin columns and bridging areas.

15. A process according to claim 14 in which the applying resin step also comprises the step of applying resin so as to create continuous columns of resin of the first concentration along the troughs of the fluted medium.

* * * * *

UNITED STATES PATENT AND TRADEMARK OFFICE
CERTIFICATE OF CORRECTION

PATENT NO. : 5,292,391
DATED : March 8, 1994
INVENTOR(S) : Scott A. Wallick

It is certified that error appears in the above-indentified patent and that said Letters Patent is hereby corrected as shown below:

Cover page, Item [73] Assignee, "Wyerhaeuser Company" should read -- Weyerhaeuser Company --.

Column 2, line 26, "of about " should read --of about 59 lbs/in. obviously, in order to create the higher basis --.

Column 11, line 40 "tee" should read --the --.

Signed and Sealed this

Seventh Day of March, 1995

Attest:

BRUCE LEHMAN

Attesting Officer

Commissioner of Patents and Trademarks